(12) United States Patent
Higuchi et al.

(10) Patent No.: US 9,031,718 B2
(45) Date of Patent: May 12, 2015

(54) AIRCRAFT AND CONTROL METHOD THEREFOR

(71) Applicant: Mitsubishi Heavy Industries, Ltd., Tokyo (JP)

(72) Inventors: Yosuke Higuchi, Tokyo (JP); Takeshi Matsuda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/352,501

(22) PCT Filed: Oct. 12, 2012

(86) PCT No.: PCT/JP2012/076382
§ 371 (c)(1),
(2) Date: Apr. 17, 2014

(87) PCT Pub. No.: WO2013/058171
PCT Pub. Date: Apr. 25, 2013

(65) Prior Publication Data
US 2014/0231591 A1    Aug. 21, 2014

(30) Foreign Application Priority Data
Oct. 21, 2011   (JP) ................................. 2011-231874

(51) Int. Cl.
*G05D 1/08*   (2006.01)
*B64C 19/00*  (2006.01)
*B64C 13/44*  (2006.01)

(52) U.S. Cl.
CPC ................ *B64C 19/00* (2013.01); *B64C 13/44* (2013.01); *G05D 1/0858* (2013.01)

(58) Field of Classification Search
USPC ........................................................ 244/175
See application file for complete search history.

(56) References Cited

U.S. PATENT DOCUMENTS 5,553,817 A * 9/1996 Gold et al. ..................... 244/195
5,863,012 A * 1/1999 Rollet et al. ............... 244/17.13
(Continued)

FOREIGN PATENT DOCUMENTS

| JP | 5-112297 | 5/1993 |
| JP | 9-258647 | 10/1997 |

(Continued)

OTHER PUBLICATIONS

International Search Report issued Jan. 8, 2013 in International Application No. PCT/JP2012/076382.
Written Opinion of the International Searching Authority issued Jan. 8, 2013 in International Application No. PCT/JP2012/076382.

*Primary Examiner* — Christopher P Ellis
*Assistant Examiner* — Medhat Badawi
(74) *Attorney, Agent, or Firm* — Wenderoth, Lind & Ponack, L.L.P.

(57) ABSTRACT

An aircraft is provided with: an attitude control command calculating section which calculates an attitude control command for target attitude on the basis of a control stick operation amount; a gain value generating section which generates a gain value equal to or less than 1 which decreases as the control stick operation amount is larger; a multiplication section which multiplies the attitude control command for target attitude by the gain value; and a addition section which adds a rate damping control command to the attitude control command for target attitude multiplied by the gain value and outputs a result to a subtraction section for calculating an SAS command.

7 Claims, 8 Drawing Sheets

(56) References Cited

U.S. PATENT DOCUMENTS

| | | | |
|---|---|---|---|
| 6,059,226 A * | 5/2000 | Cotton et al. | 244/17.13 |
| 6,819,266 B2 * | 11/2004 | Greene | 340/969 |
| 7,421,320 B2 * | 9/2008 | Yeh | 701/3 |
| 7,433,765 B2 * | 10/2008 | Fanciullo et al. | 701/3 |
| 7,930,074 B2 * | 4/2011 | Cherepinsky et al. | 701/12 |
| 8,231,085 B2 * | 7/2012 | Cherepinsky | 244/223 |
| 8,688,295 B2 * | 4/2014 | Ellis et al. | 701/3 |
| 2006/0253230 A1 | 11/2006 | Fanciullo et al. | |
| 2010/0076625 A1 * | 3/2010 | Yoeli | 701/4 |
| 2013/0261853 A1 * | 10/2013 | Shue et al. | 701/3 |
| 2013/0274963 A1 * | 10/2013 | Shue et al. | 701/3 |
| 2014/0191087 A1 * | 7/2014 | Higuchi et al. | 244/230 |

FOREIGN PATENT DOCUMENTS

| | | |
|---|---|---|
| JP | 9-512762 | 12/1997 |
| JP | 11-263297 | 9/1999 |
| JP | 2000-264291 | 9/2000 |
| JP | 3195918 | 8/2001 |
| JP | 2008-540218 | 11/2008 |
| JP | 4289795 | 7/2009 |
| JP | 2011-57178 | 3/2011 |
| WO | 95/30181 | 11/1995 |
| WO | 99/64942 | 12/1999 |
| WO | 2007/084170 | 7/2007 |

* cited by examiner

(A) RATE DAMPING CONTROL COMMAND (B) ATTITUDE CONTROL COMMAND FOR TARGET ATTITUDE (C) FBW CONTROL LAW COMMAND (D) ATTITUDE

AIRCRAFT AND CONTROL METHOD THEREFOR

BACKGROUND OF THE INVENTION

1. Technical Field

The present invention relates to an aircraft and a control method for the aircraft.

2. Description of the Related Art

In an electronic manipulation system generally referred to as a fly-by-wire (hereinafter referred to as "FBW") system, among aircraft manipulation systems, manipulation characteristics are improved by performing control of giving FBW control law commands, such as an attitude command control causing the amount of change in the attitude of an aircraft to correspond to a manipulation amount for a control stick and a speed command control causing the amount of change in speed to correspond to the manipulation amount for the control stick, to an actuator for driving a steering mechanism.

As a system for realizing control similar to the control of the FBW system by a mechanical manipulation system in which the control stick and the steering mechanism are mechanically connected with a series actuator (SAS (stability augmentation system) actuator) for mechanical linkage and increase in stability, a partial authority flight control system (hereinafter referred to as "PAFCS") exists.

Since the control stick and the steering mechanism are mechanically connected in the PAFCS system, it is not necessary to compose a redundant system for providing high reliability to a control system, unlike the FBW system. In the PAFCS system, however, the operating range (authority) of the SAS actuator is restricted so as to enable manipulation by a pilot even when the control system is abnormal.

As an example of the PAFCS system, Japanese Patent No. 3195918 describes a flight control apparatus for helicopter configured with: a link mechanism for mechanically transmitting a manipulation amount for a manipulation section to a steering mechanism to drive the steering mechanism, a flight control law calculating section calculating a flight control law of a helicopter on the basis of a manipulation signal indicating detection of the manipulation amount for the manipulation section and outputting a steering mechanism driving signal, and a precision servo actuator section adding the amount of difference corresponding to a difference signal obtained by subtracting the manipulation signal from the driving signal, to the manipulation amount transmitted by the link mechanism.

SUMMARY OF THE INVENTION

Technical Problem

In the PAFCS system, a control stick and a steering mechanism are mechanically connected unlike the FBW system, and, therefore, the control surface moves according to an operation amount for the control stick (the control stick operation amount). Therefore, as described in Japanese Patent No. 3195918, an SAS command for driving an SAS actuator is calculated by subtracting the control stick operation amount from an FBW control law command as shown in an equation (1).

$$SAS \text{ command} = FBW \text{ control law command} - \text{control stick operation amount} \quad (1)$$

However, when the control stick operation amount is too large, and the size of the SAS command calculated from the equation (1) is beyond the operating range of the SAS actuator, the SAS actuator is in a state of remaining being extended or contracted in one direction and not operating any more (a saturated state). In this state, it becomes impossible to perform control of the control surface, that is, control of the airframe.

Especially, when, in controlling the attitude of the airframe, the operation amount for the control stick is too large, so that a generated attitude control command for target attitude is excessive and the actuator is in the saturated state, a control command for stabilizing the aircraft becomes ineffective. As a result, a risk of divergence of the attitude of the airframe occurs.

Figure 8:
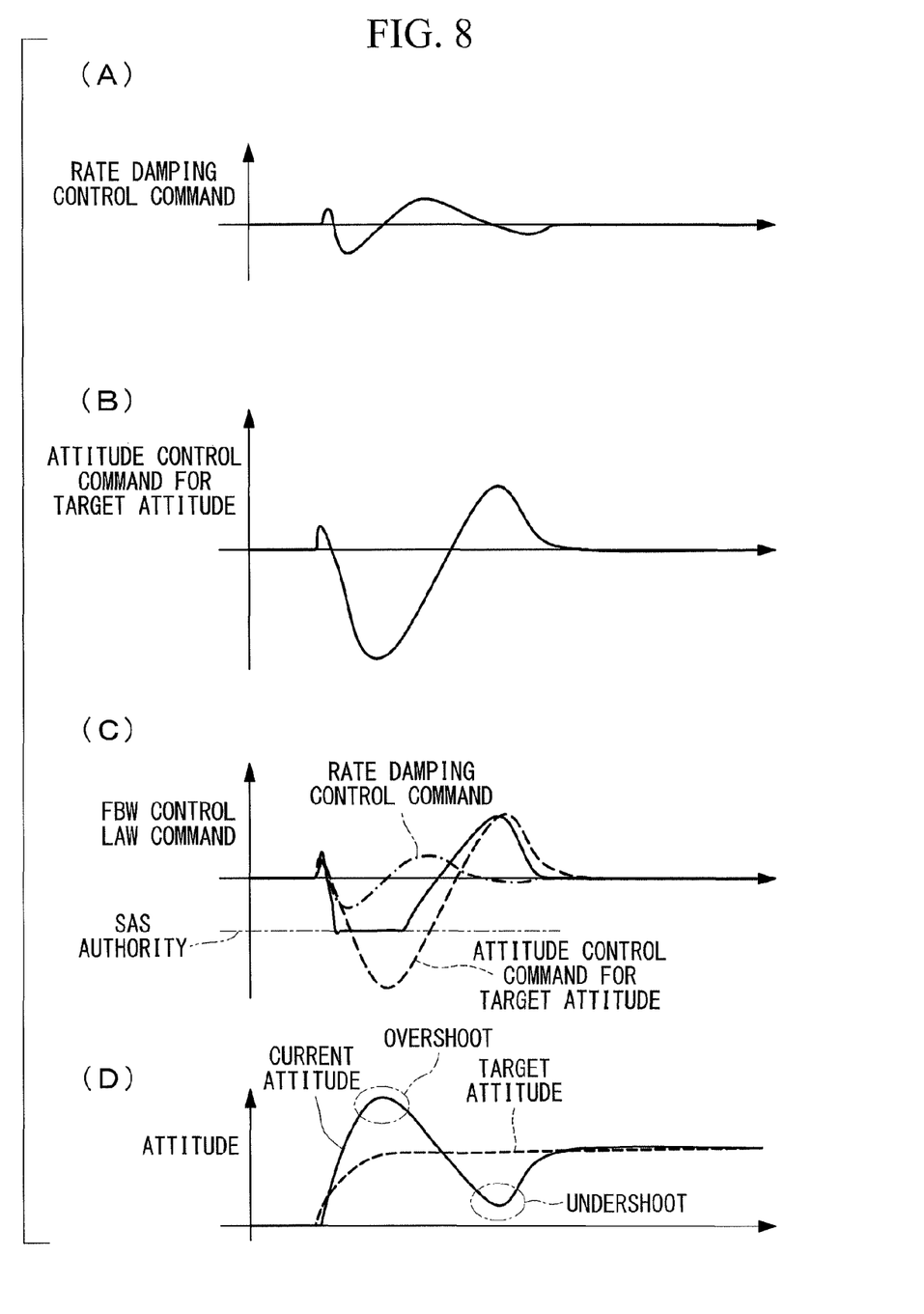
FIG. 8 is a graph showing change in each command in the case where, because an operation amount for a control stick is too large, an actuator is in a saturated state.

FIG. 8 is a graph showing change in each command and the attitude of the airframe in the case where, since the operation amount for the control stick is too large, the actuator is in the saturated state. In FIG. 8, the control command for stabilizing the airframe is assumed to be a rate damping control command for applying brake to stabilize the airframe in the case where the nose is lifted up or lifted down too much, as an example. That is, the sum of the rate damping control command and the attitude control command for target attitude becomes the FBW control law command. FIG. 8(A) shows temporal change in the rate damping control command; FIG. 8(B) shows temporal change in the attitude control command for target attitude; FIG. 8(C) shows temporal change in the FBW control law command; and FIG. 8(D) shows the attitude of the airframe.

As shown in FIG. 8(C), when the operation amount for the control stick is too large, the attitude control command for target attitude becomes excessive. Therefore, the FBW control law command also becomes excessive and is beyond the operating range of the SAS actuator (SAS authority). As a result, the SAS actuator is in the saturated state at the upper limit of the operating range of the SAS actuator and does not operate any more. In this case, the rate damping control command is not effective because the attitude control command for target attitude, which is in an opposite direction to the rate damping control command, is too large. Therefore, the airframe does not move in a damping direction shown by the rate damping control command.

As a result, the control surface cannot be controlled, and the attitude (current attitude) of the airframe largely overshoots relative to a target attitude as shown FIG. 8(D). When the attitude is overshot relative to the target attitude, the attitude is then undershot relative to the target attitude at the time of coming near to the target attitude again with the rate damping control command remaining ineffective. As a result, a risk of divergence of the attitude of the airframe occurs.

The present invention has been made in view of such a situation, and the its object is to provide an aircraft preventing, even if the system of manipulating the airframe is the PAFCS system, the attitude of the airframe from being unstable because the operation amount for the control stick is too large, and a control method for the aircraft.

Solution to the Problem

In order to solve the above problem, the aircraft and the control method for the aircraft according to the present invention adopt the following solutions.

An aircraft according to a first aspect of the present invention is provided with: a control stick for a pilot to manipulate an airframe; an adjustment part for adjusting an angle of a neutral position of the control stick; a steering amount transmitting part for mechanically transmitting an operation amount for the control stick to a steering part; a detection part for detecting the operation amount; a control amount calculating part for calculating a control amount for the airframe corresponding to the operation amount detected by the detection part; a subtraction part for subtracting the operation amount outputted from the detection part, from the control amount calculated by the control amount calculating part; and an actuator for adding an operation amount corresponding to a subtraction value outputted from the subtraction part to the operation amount transmitted by the steering amount transmitting part, wherein the control amount calculating part includes: an attitude control calculating part for calculating an attitude control amount for causing an attitude of the airframe to be a target value, on the basis of the operation amount detected by the detection part; a gain value generating part for generating a gain value equal to or less than 1 that decreases as a required control amount indicating a control amount to be required from the airframe increases; a multiplication part for multiplying the attitude control amount outputted from the attitude control calculating part by the gain value generated by the gain value generating part; an addition part for adding a stabilization control amount for stabilizing the airframe to the attitude control amount multiplied by the gain value by the multiplication part and outputting a result to the subtraction part; and a correction signal generating part for generating a correction signal for correcting the angle of the neutral position of the control stick according to the target attitude control amount which has been decreased by being multiplied by the gain value and outputting the correction signal to the adjustment part.

According to this configuration, the operation amount for the control stick is mechanically transmitted to the steering part by the steering amount transmitting part. The operation amount for the control stick is detected by the detection part, and the control amount for the airframe corresponding to the operation amount is calculated by the control amount calculating part. The control amount calculating part calculates an attitude control amount for causing the attitude of the airframe to be a target value, on the basis of the operation amount detected by the detection part, adds a stabilization control amount for stabilizing the airframe to the attitude control amount to calculate the control amount for the airframe.

Then, the operation amount detected by the detection part is subtracted from the control amount calculated by the control amount calculating part, by the subtraction part. That is, a subtraction value outputted from the subtraction part becomes a control command to the actuator.

The actuator adds an operation amount corresponding to the subtraction value (control command) outputted from the subtraction part, to the operation amount transmitted by the steering amount transmitting part. That is, an aircraft manipulation system according to this configuration is the PAFC system in which the steering part is driven by the sum of the operation amount transmitted by the steering amount transmitting part and the operation amount by the actuator.

Here, in a conventional PAFC system, when the operation amount for the control stick is too large, the control amount calculated by the control amount calculating part is large, and, therefore, there may be a case where the subtraction value (control command) is beyond the operation range of the actuator. In this case, the actuator is in a state of remaining being extended or contracted in one direction and not operating any more (the saturated state). The case where the operation amount for the control stick is too large is, for example, a case where the control stick is tilted to the maximum in one direction. Especially, when, in controlling the attitude of the airframe, the operation amount for the control stick is too large, so that the attitude control amount is excessive and the actuator is in the saturation state, there may be a case where the stabilization control amount for stabilizing the airframe becomes ineffective. As a result, a risk of divergence of the attitude of the airframe occurs.

Thus, in this configuration, a gain value equal to or less than 1 that decreases as a required control amount indicating the control amount to be required from the airframe is larger is generated, and the attitude control command for target attitude is multiplied by the generated gain value by the gain value generating part. Then, the attitude control amount multiplied by the gain value and the stabilization control amount are added and made to be the control amount for the airframe calculated by the control amount calculating part. Thereby, the attitude control amount is smaller as the required control amount is larger, and, therefore, it is prevented that the attitude control amount becomes excessive and the actuator is in the saturated state, and room for making the stabilization control amount effective occurs.

Furthermore, the attitude control amount is decreased by being multiplied by the gain value and is smaller than a required value. Therefore, a correction signal for correcting the angle of the neutral position of the control stick is generated by the correction signal generating part according to the attitude control amount decreased by being multiplied by the gain value and inputted to the adjustment part adjusting the angle of the neutral position of the control stick.

Here, the neutral position of the control stick is assumed to be, for example, vertical. The control stick is configured so that, when the control stick is tilted to operate the airframe, reaction force is given by action of biasing force caused by a spring connected at the root of the control stick and returned to the neutral position. The adjustment part adjusts the angle of the neutral position of the control stick, in other words, the center of the reaction force to be given to the control stick by shifting the center position of the spring. By the adjustment by the adjustment part, the center of the reaction force acting on the control stick is shifted to the side of causing the airframe to be toward the target attitude. Thereby, an operation of the airframe by the pilot is prompted to cause the airframe to move toward the target attitude.

As described above, room for making the stabilization control amount effective occurs even if the attitude control amount is excessive, and the pilot is prompted to use an operation amount corresponding to the decreased attitude control amount in a form of reaction force of the control stick. Therefore, this configuration can prevent the attitude of the airframe from being unstable because the amount of operation of the control stick is too large.

In the above first aspect, it is preferable that the gain value generating part uses the operation amount detected by the detection part as the required control amount.

According to this configuration, since a gain value is generated with the operation amount for the control stick as the required control amount, it is possible to easily generate an appropriate gain value.

In the above first aspect, it is preferable that the gain value generating part uses a deviation between a current attitude of the airframe and a target attitude of the airframe as the required control amount.

According to this configuration, since a gain value is generated with a deviation between the current attitude of the airframe and the target attitude of the airframe as the required control amount, it is possible to easily generate an appropriate gain value.

In the above first aspect, it is preferable that the gain value generating part generates 1 as the gain value if the required control amount is equal to or below a predetermined value, and generates the gain value that decreases by a value less than 1 according to a size of the required control amount if the required control amount exceeds the predetermined value.

According to this configuration, since the gain value decreases by a value less than 1 according to the size of the required control amount if the required control amount exceeds the predetermined value, it is possible to decrease the attitude control amount and cause the stabilization control amount for stabilizing the airframe to be effective only when the required control amount is large.

A control method for an aircraft according to a second aspect of the present invention is a control method for an aircraft provided with: a control stick for a pilot to manipulate an airframe; an adjustment part for adjusting an angle of a neutral position of the control stick; a steering amount transmitting part for mechanically transmitting an operation amount for the control stick to a steering part; a detection part for detecting the operation amount; a control amount calculating part calculating a control amount for the airframe corresponding to the operation amount detected by the detection part; a subtraction part for subtracting the operation amount outputted from the detection part, from the control amount calculated by the control amount calculating part; and an actuator for adding an operation amount corresponding to a subtraction value outputted from the subtraction part to the operation amount transmitted by the steering amount transmitting part; and the control method includes: a first step of calculating an attitude control amount for causing an attitude of the airframe to be a target value, on the basis of the operation amount detected by the detection part; a second step of generating a gain value equal to or less than 1 that decreases as a required control amount indicating a control amount to be required from the airframe increases; a third step of multiplying the attitude control amount outputted from the attitude control calculating part by the generated gain value; a fourth step of adding a stabilization control amount for stabilizing the airframe to the attitude control amount multiplied by the gain value and outputting a result to the subtraction part; and a fifth step of generating a correction signal for correcting the angle of the neutral position of the control stick according to the attitude control amount which has been decreased by being multiplied by the gain value and outputting the correction signal to the adjustment part.

Advantageous Effects of the Invention

According to the present invention, an excellent advantage is obtained that, even if the system of manipulating the airframe is a PAFCS system, it is possible to prevent the attitude of the airframe from being unstable because the operation amount for the control stick is too large.

DETAILED DESCRIPTION OF THE INVENTION

Embodiments of an aircraft and a control method for the aircraft according to the present invention will be described below with reference to drawings.
<First Embodiment>
A first embodiment of the present invention will be described below.

Figure 1:
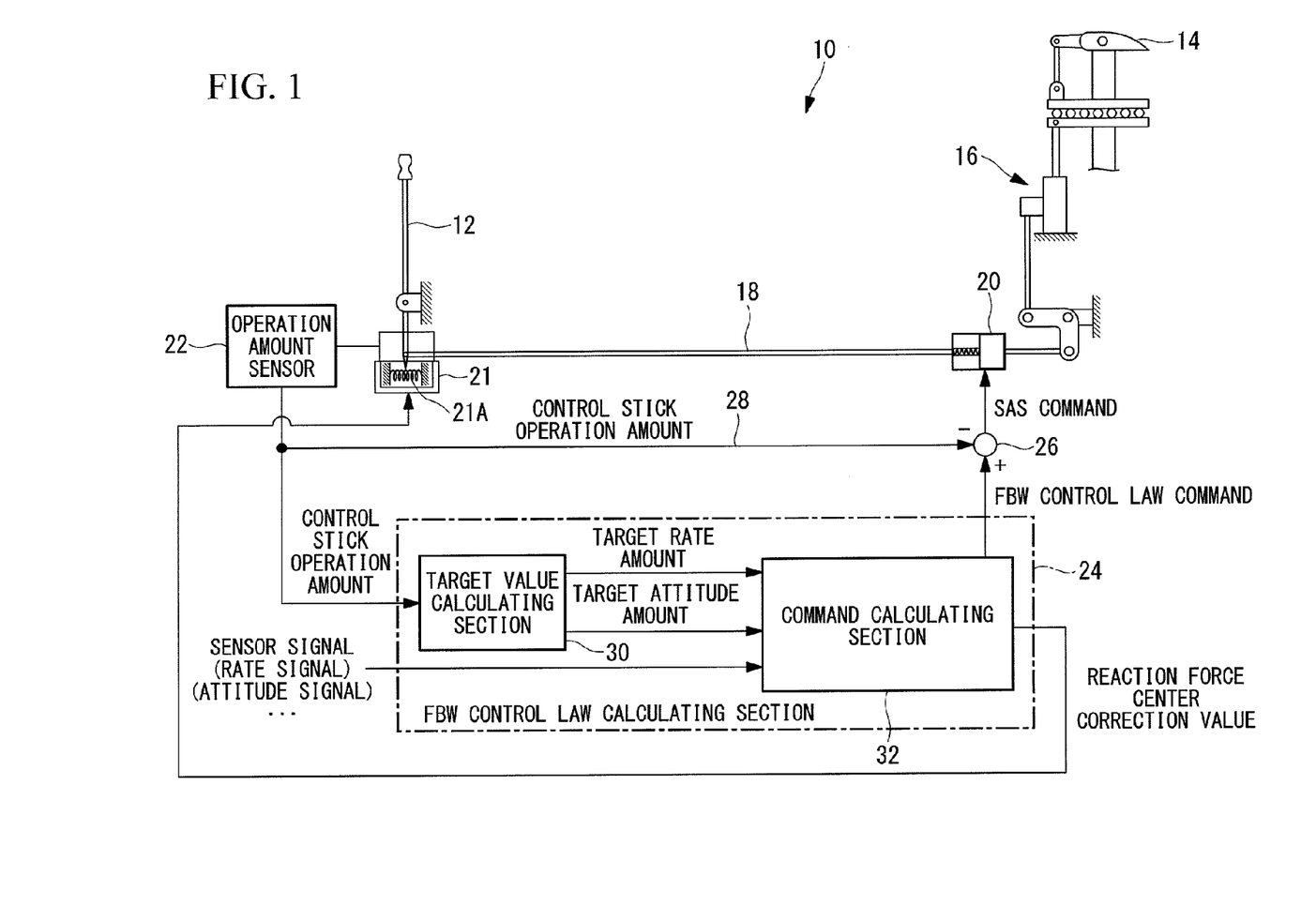
FIG. 1 is a block diagram showing a configuration related to control of an aircraft according to a first embodiment of the present invention.

FIG. 1 is a block diagram showing a configuration related to control of an aircraft 10 according to the present first embodiment. As an example, the aircraft 10 according to the present first embodiment is assumed to be a helicopter. The manipulation system of the aircraft 10 according to the present first embodiment is a PAFCS system.

As shown in FIG. 1, the aircraft 10 is provided with a mechanical linkage 18 which mechanically transmits an operation amount for a control stick 12 for a pilot to manipulate an airframe, to a steering mechanism 16 having a control surface 14. The control stick 12 is connected at one end of the mechanical linkage 18, and an SAS actuator 20 which drives the steering mechanism 16 is connected at the other end of the mechanical linkage 18.

The control stick 12 is provided with an adjustment mechanism 21 which adjusts the angle of the neutral position of the control stick 12.

Here, the neutral position of the control stick 12 is assumed to be, for example, vertical. The control stick 12 is configured so that, when the control stick 12 is tilted to operate the airframe, reaction force is given by action of biasing force caused by a spring 21A connected at the root of the control stick 12 and returned to the neutral position. The adjustment mechanism 21 adjusts the angle of the neutral position of the control stick 12, in other words, the center of the reaction force to be given to the control stick 12 by shifting the center position of the spring 21A with an actuator not shown.

Furthermore, the aircraft 10 is provided with an operation amount sensor 22 which detects the operation amount for the control stick 12 (hereinafter referred to as "the control stick operation amount") and an FBW control law calculating section 24 which calculates an airframe control amount (hereinafter referred to as "an FBW control law command") corresponding to the control stick operation amount detected by the operation amount sensor 22.

The FBW control law calculating section 24 is provided with a target value calculating section 30 and a command calculating section 32.

The target value calculating section 30 calculates a target rate amount indicating a target value of various rotation angle velocities of the airframe and a target attitude amount indicating a target value of the attitude of the airframe, on the basis of the control stick operation amount detected by the operation amount sensor 22. The command calculating section 32 calculates the FBW control law command on the basis of the target rate amount, the target attitude amount and sensor signals detected by various sensors, such as a rate signal and an attitude signal. The command calculating section 32 calculates a reaction force center correction value for correcting the center of reaction force to be given to the control stick 12 and outputs the reaction force center correction value to the adjustment mechanism 21.

The control stick operation amount detected by the operation amount sensor 22 is transmitted through an operation amount offset line 28 and inputted to a subtraction section 26, and the FBW control law command is also inputted to the subtraction section 26.

Then, the subtraction section 26 subtracts the control stick operation amount transmitted through the operation amount offset line 28 from the FBW control law command. A subtraction value by the subtraction section 26 is outputted as an SAS command for controlling the SAS actuator 20 and inputted to the SAS actuator 20.

The SAS actuator 20 drives the steering mechanism 16 on the basis of a value obtained by adding the operation amount for the control stick 12 transmitted through the mechanical linkage 18 and the SAS command outputted from the subtraction section 26.

Figure 2:
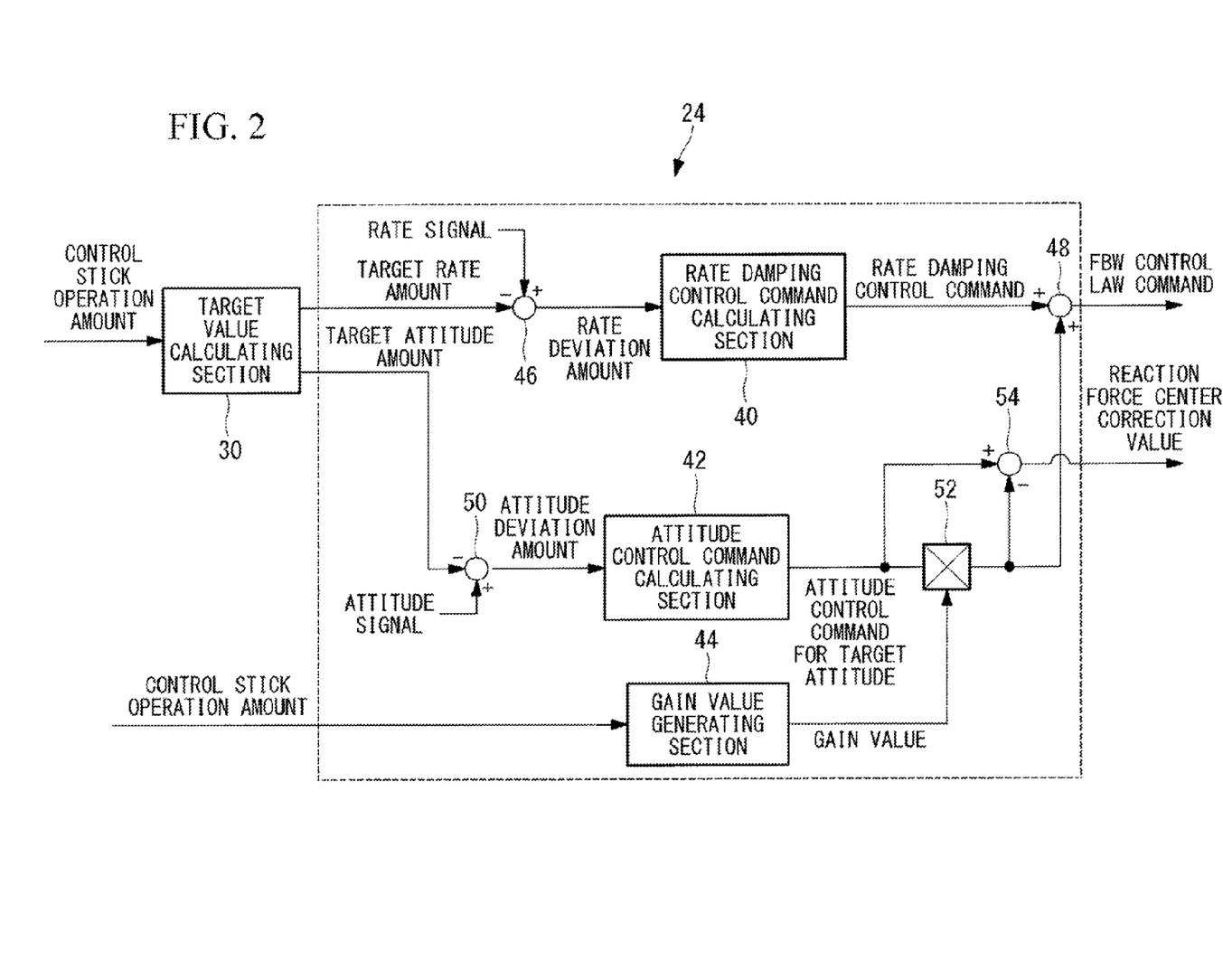
FIG. 2 is a function block diagram showing functions of an FBW control law calculating section according to the first embodiment of the present invention.

FIG. 2 is a function block diagram showing functions of the FBW control law calculating section 24 according to the first embodiment.

The FBW control law calculating section 24 is provided with a rate damping control command calculating section 40, an attitude control command calculating section 42 and a gain value generating section 44.

The rate damping control command calculating section 40 calculates a rate damping control command for stabilizing the airframe on the basis of the control stick operation amount.

Specifically, a target rate amount outputted from the target value calculating section 30 is subtracted from a detected rate signal by a subtraction section 46 to calculate a rate deviation amount. Then, the rate deviation amount is inputted to the rate damping control command calculating section 40. The rate damping control command calculating section 40 calculates the rate damping control command on the basis of the rate deviation amount and outputs the rate damping control command to an addition section 48.

The attitude control command calculating section 42 calculates an attitude control command for target attitude for causing the attitude of the airframe to be a target value on the basis of the control stick operation amount.

Specifically, a target attitude amount outputted from the target value calculating section 30 is subtracted from a detected attitude signal by a subtraction section 50 to calculate an attitude deviation amount. Then, the attitude deviation amount is inputted to the attitude control command calculating section 42. The attitude control command calculating section 42 calculates an attitude control command on the basis of the attitude deviation amount and outputs the attitude control command to a multiplication section 52.

The gain value generating section 44 generates a gain value equal to or less than 1 which decreases as a required control amount indicating a control amount required from the airframe is larger, and outputs the generated gain value to the multiplication section 52. In the present first embodiment, the control stick operation amount is used as the required control amount.

Figure 3:
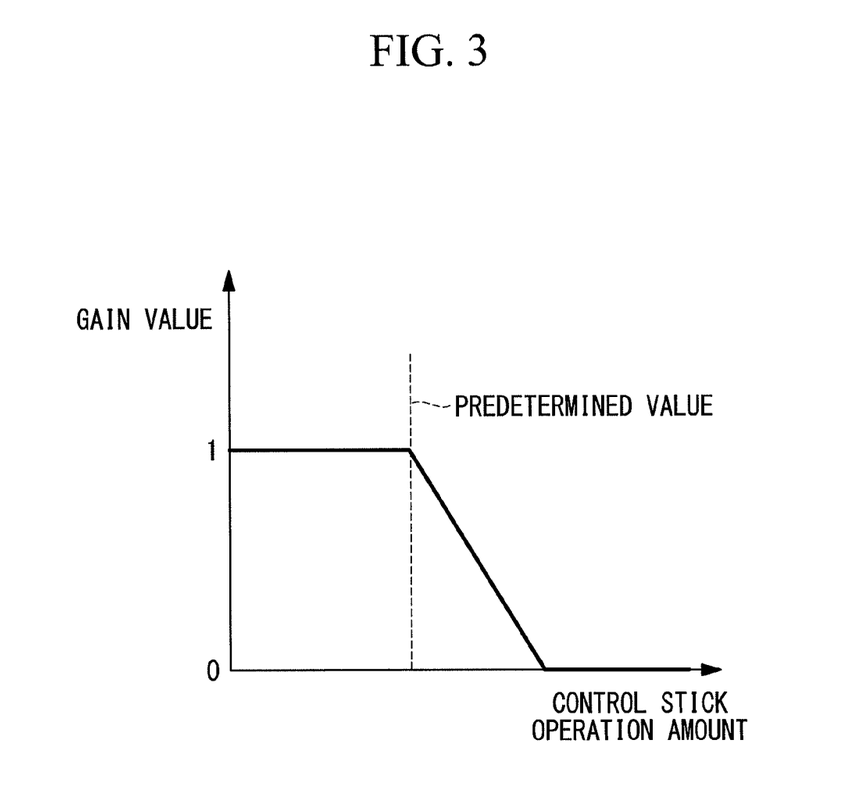
FIG. 3 is a graph showing change in a gain value according to the first embodiment of the present invention.

FIG. 3 is a graph showing change in the gain value according to the present first embodiment.

The gain value generating section 44 generates 1 as the gain value if the control stick operation amount is equal to or below a predetermined value, and generates a gain value which decreases by a value less than 1 according to the size of the control stick operation amount if the control stick operation amount exceeds the predetermined value. An arbitrary value is predetermined. The minimum value of the gain value is 0 (zero). The gain value generating section 44 according to the present first embodiment causes the gain value to linearly decrease according to the size of the control stick operation amount if the control stick operation amount exceeds the predetermined value but is not limited thereto. The gain value may be curvilinearly or gradually decreased.

The multiplication section 52 multiplies the attitude control command for target attitude outputted from the attitude control command calculating section 42 by the gain value generated by the gain value generating section 44 and outputs the result to the addition section 48.

The addition section 48 adds the rate damping control command to the attitude control command for target attitude multiplied by the gain value by the multiplication section 52 to obtain the FBW control law command and outputs the FBW control law command to the subtraction section 26.

Furthermore, the command calculating section 32 according to the present first embodiment is provided with a subtraction section 54 which subtracts the attitude control command for target attitude multiplied by the gain value by the multiplication section 52 from the attitude control command for target attitude. A value outputted from the subtraction section 54 is the value of the attitude control command for target attitude decreased by being multiplied by the gain value, and the value is outputted to the adjustment mechanism 21 as a reaction force center correction value.

Specifically, the adjustment mechanism 21 changes the angle of the neutral position (the center of reaction force) of the control stick 12 by adjusting the center position of the spring 21A on the basis of the reaction force center correction value by an actuator not shown to shift the center of reaction force working on the control stick 12 to the side where the airframe is toward a target attitude. Thereby, an operation of the airframe by the pilot is prompted to cause the airframe to move toward the target attitude.

Next, a control method for the aircraft 10 according to the present first embodiment will be described.

In an aircraft adopting a conventional PAFCS manipulation system, there may be a case where, because the operation amount for the control stick is too large in controlling the attitude of the airframe, the attitude control command for target attitude generated to cause the attitude of the airframe to be a target value is excessive and is beyond the operating range of the SAS actuator. In such a case, the SAS actuator is in a saturated state, and the control surface cannot be controlled. Thereby, the attitude of the airframe largely overshoots relative to a target attitude. In this case, since the SAS actuator is in the saturated state, the rate damping control command for stabilizing the airframe becomes ineffective. When the attitude is overshot relative to the target attitude, there may be a case where the attitude is then undershot relative to the target attitude at the time of coming near to the target attitude again with the rate damping control command remaining ineffective. As a result, a risk of divergence of the attitude of the airframe occurs.

On the other hand, in the aircraft 10 according to the present first embodiment, a gain value equal to or less than 1 which decreases as the control stick operation amount is larger is generated by the gain value generating section 44, and the attitude control command for target attitude is multiplied by the generated gain value. Then, the attitude control command for target attitude multiplied by the gain value and the rate damping control command are added to obtain the FBW control law command. Thereby, the attitude control command for target attitude is smaller as the control stick operation amount is larger, and, therefore, it is prevented that the target attitude command becomes excessive and the SAS actuator 20 is in the saturated state, and room for making the rate damping control command effective occurs.

Figure 4:
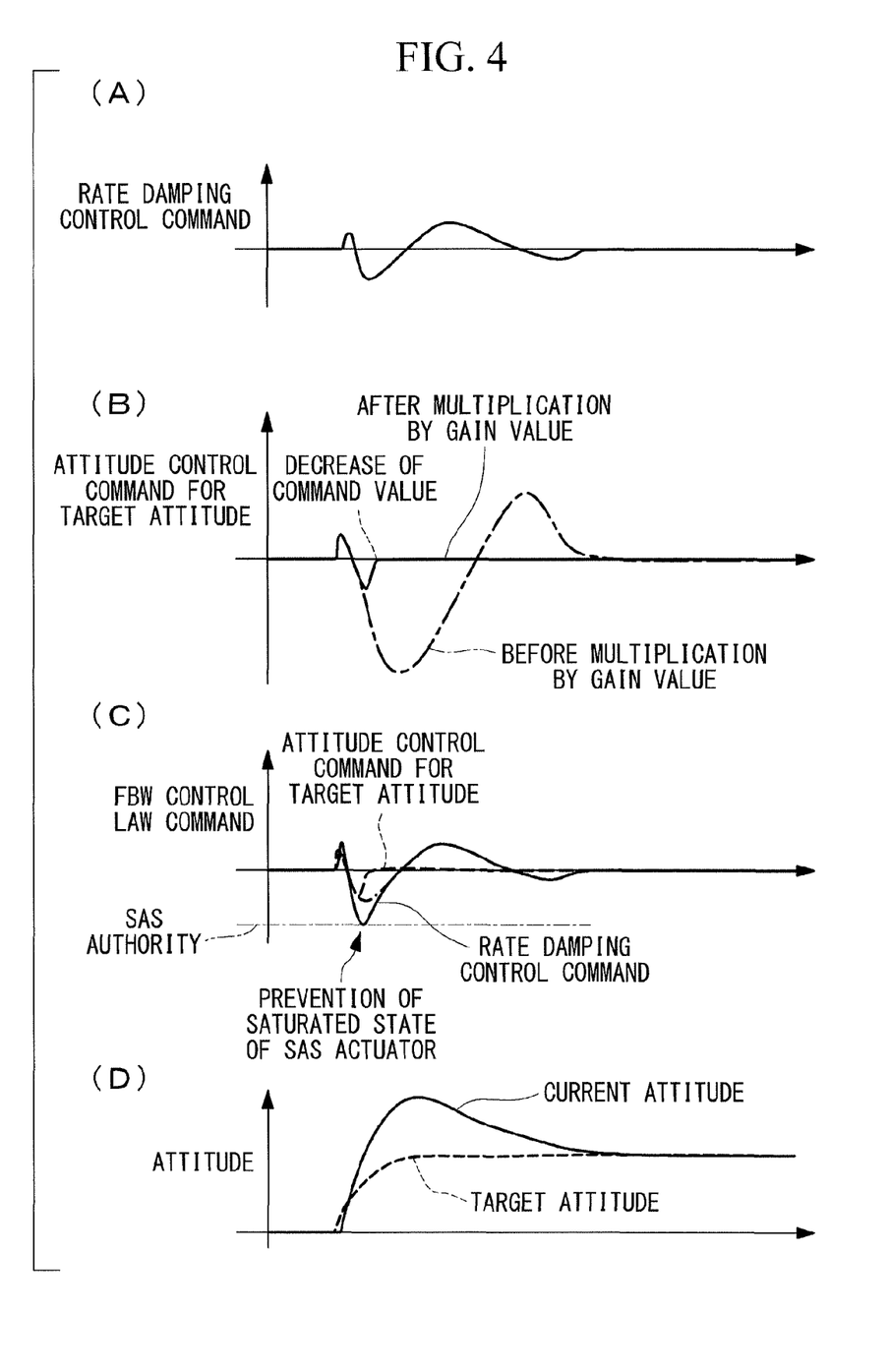
FIG. 4 is a graph showing change in each command and the attitude of an airframe according to the first embodiment of the present invention.

The control method for the aircraft 10 according to the present first embodiment will be described more specifically with reference to FIG. 4. FIG. 4 is a graph showing change in each command and the attitude of the airframe according to the present first embodiment.

FIG. 4(A) shows temporal change in the rate damping control command. In general, the output duration time of the rate damping control command is shorter than that of the attitude control command for target attitude.

FIG. 4(B) shows temporal change in the attitude control command for target attitude. In FIG. 4(B), a one-dot chain line indicates the attitude control command for target attitude before the attitude control command for target attitude is multiplied by a gain value. On the other hand, a solid line indicates the attitude control command for target attitude after the attitude control command for target attitude is multiplied by the gain value. Thus, when the control stick operation amount exceeds a predetermined value, the value of the attitude control command for target attitude is decreased down to 0 (zero) according to the size of the control stick operation amount.

FIG. 4(C) shows temporal change in the FBW control law command. The FBW control law command indicated by a solid line is the sum of the attitude control command for target attitude and the rate damping control command. However, since the attitude control command for target attitude has been multiplied by a gain value corresponding to the control stick operation amount, the FBW control law command is prevented from being beyond the operating range (SAS authority) of the SAS actuator 20, and thereby the SAS actuator 20 is prevented from being in the saturated state. Since the rate damping control command is more effective than the attitude control command for target attitude while the control stick operation amount is large, the control surface is controlled by the rate damping control command, and the stability of the airframe is improved.

By being multiplied by a gain value corresponding to the control stick operation amount, the value of the attitude control command for target attitude is decreased below a required value. Therefore, in the aircraft 10 according to the present first embodiment, the reaction force center correction value is inputted to the adjustment mechanism 21 as described above.

The reaction force center correction value is a deviation between the attitude control command for target attitude and the attitude control command for target attitude multiplied by the gain value by the multiplication section 52, and the deviation is the attitude control command for target attitude decreased and is originally a control amount required to control the attitude of the airframe. Therefore, the adjustment mechanism 21 changes the reaction force center to be given to the control stick 12 on the basis of the reaction force center correction value so as to prompt the pilot to perform an operation corresponding to the deviation.

Thereby, by performing an operation of the control stick 12 the reaction force center of which has been changed, in a state in which the rate damping control command is effective, the attitude is controlled to be a target attitude while undershoot is prevented, as shown in FIG. 4(D).

As described above, the aircraft 10 according to the present first embodiment is provided with: the attitude control command section 42 which calculates the attitude control command for target attitude on the basis of the control stick operation amount; the gain value generating section 44 which generates a gain value equal to or less than 1 which decreases as the control stick operation amount is larger, as a required control amount; the multiplication section 52 which multiplies the attitude control command for target attitude by the gain value; and the addition section 48 which adds the rate damping control command to the attitude control command for target attitude multiplied by the gain value and outputs the result to the subtraction section 26 for calculating the SAS command. Furthermore, the aircraft 10 is provided with the subtraction section 54 which generates a correction signal for correcting the angle of the neutral position of the control stick 12 according to the attitude control command for target attitude decreased by being multiplied by the gain value and outputs the correction signal to the adjustment mechanism 21 which adjusts the angle of the neutral position of the control stick 12.

As described above, in the aircraft 10 according to the present first embodiment, room for making the rate damping control command effective occurs even if the attitude control command for target attitude is excessive, and the pilot is prompted to use an operation amount corresponding to the decreased attitude control command for target attitude in a form of reaction force of the control stick 12. Therefore, the aircraft 10 according to the present first embodiment can prevent the attitude of the airframe from being unstable because the amount of operation of the control stick 12 is too large.

Furthermore, since the aircraft 10 according to the present first embodiment generates a gain value, with the control stick operation amount as a required control amount, it is possible to easily generate an appropriate gain value.

Furthermore, the gain value generating section 44 according to the present first embodiment generates 1 as a gain value if the control stick operation amount is equal to or below a predetermined value, and generates a gain value which decreases by a value less than 1 according to the size of the control stick operation amount if the control stick operation amount exceeds the predetermined value. Therefore, the aircraft 10 according to the present first embodiment can cause the attitude control command for target attitude to decrease and cause the rate damping control command for stabilizing the airframe to be effective only when the control stick operation amount is large.

<Second Embodiment>

A second embodiment of the present invention will be described below.

Since a configuration related to control of the aircraft 10 according to the present second embodiment is similar to the configuration related control of the aircraft 10 according to the first embodiment shown in FIG. 1, description thereof will be omitted.

Figure 5:
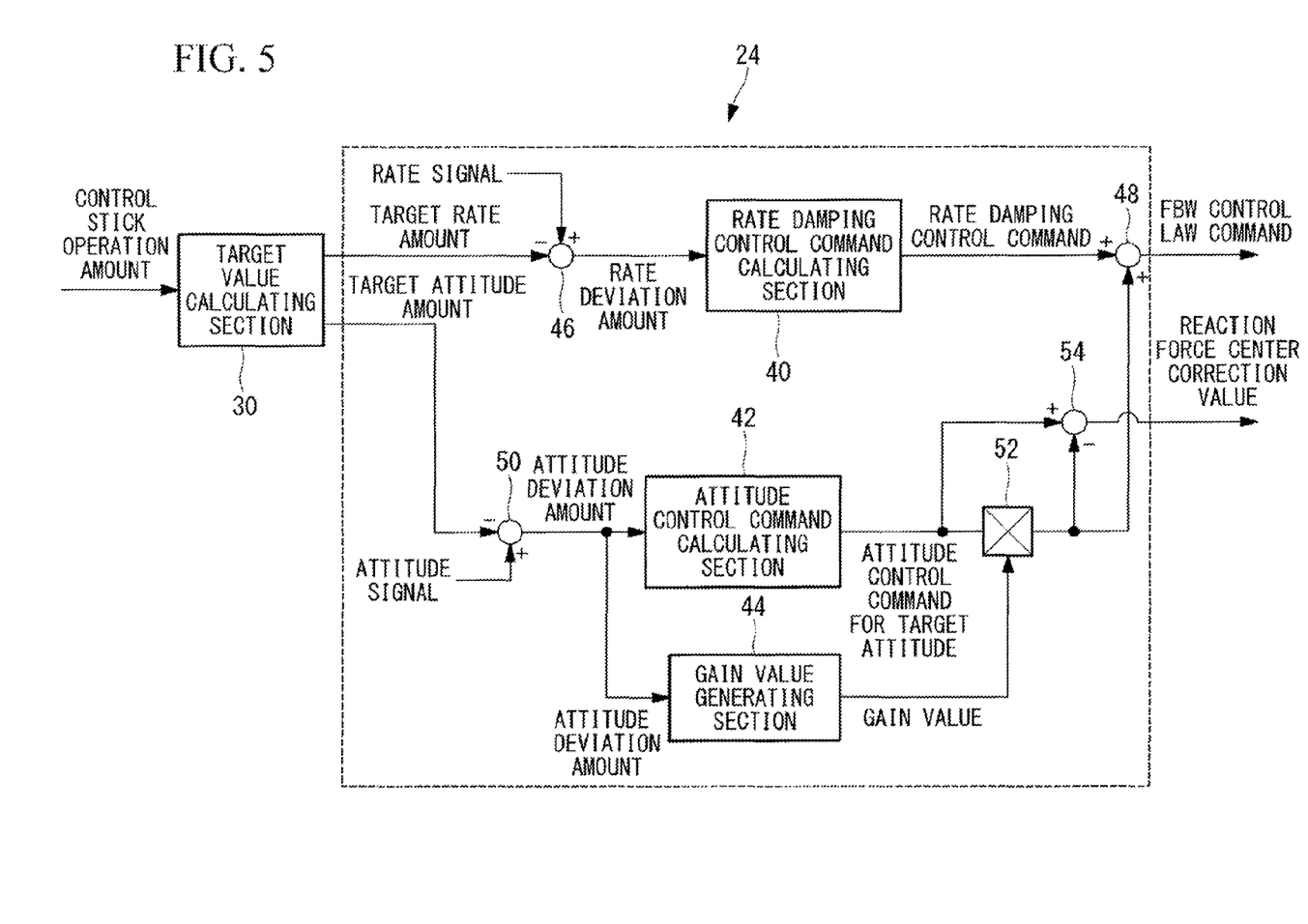
FIG. 5 is a function block diagram showing functions of an FBW control law calculating section according to a second embodiment of the present invention.

FIG. 5 shows a function block diagram showing functions of the FBW control law calculating section 24 according to the present second embodiment. The same components in FIG. 5 as those in FIG. 2 are given the same reference numerals as those in FIG. 2, and description thereof will be omitted.

In the gain value generating section 44 according to the present second embodiment, an attitude deviation amount is used as a required control amount. That is, the gain value generating section 44 according to the present second embodiment generates a gain value equal to or less than 1 which decreases as the attitude deviation amount is larger and outputs the generated gain value to the multiplication section 52.

Figure 6:
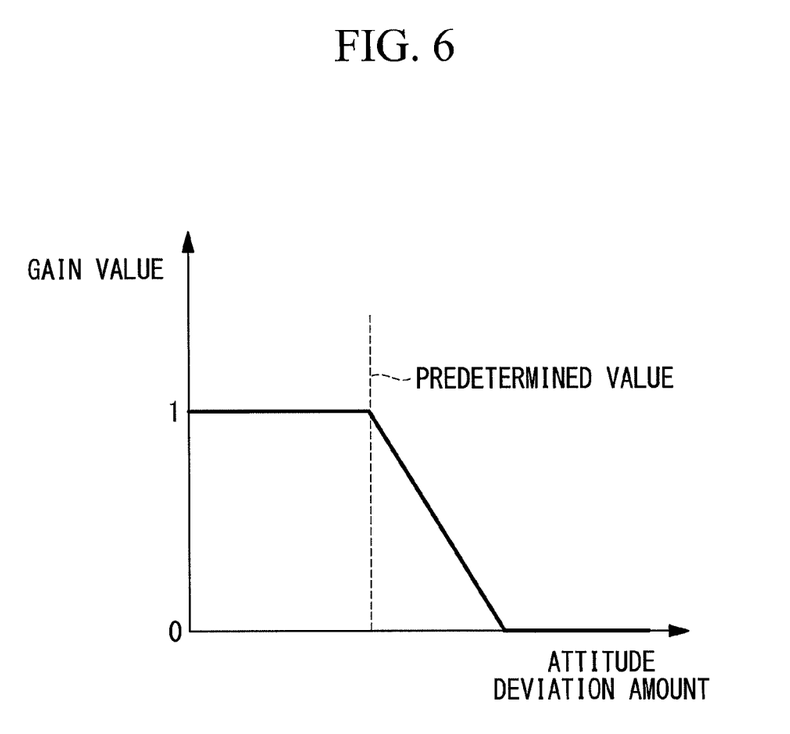
FIG. 6 is a graph showing change in gain value according to the second embodiment of the present invention.

FIG. 6 is a graph showing change in the again value according to the present second embodiment.

The gain value generating section 44 generates 1 as the gain value if the attitude deviation amount is equal to or below a predetermined value, and generates a gain value which decreases by a value less than 1 according to the size of the attitude deviation amount if the attitude deviation amount exceeds the predetermined value. An arbitrary value is predetermined. The minimum value of the gain value is 0 (zero). The gain value generating section 44 according to the present second embodiment causes the gain value to linearly decrease according to the size of the attitude deviation amount if the attitude deviation amount exceeds the predetermined value but is not limited thereto. The gain value may be curvilinearly or gradually decreased.

Figure 7:
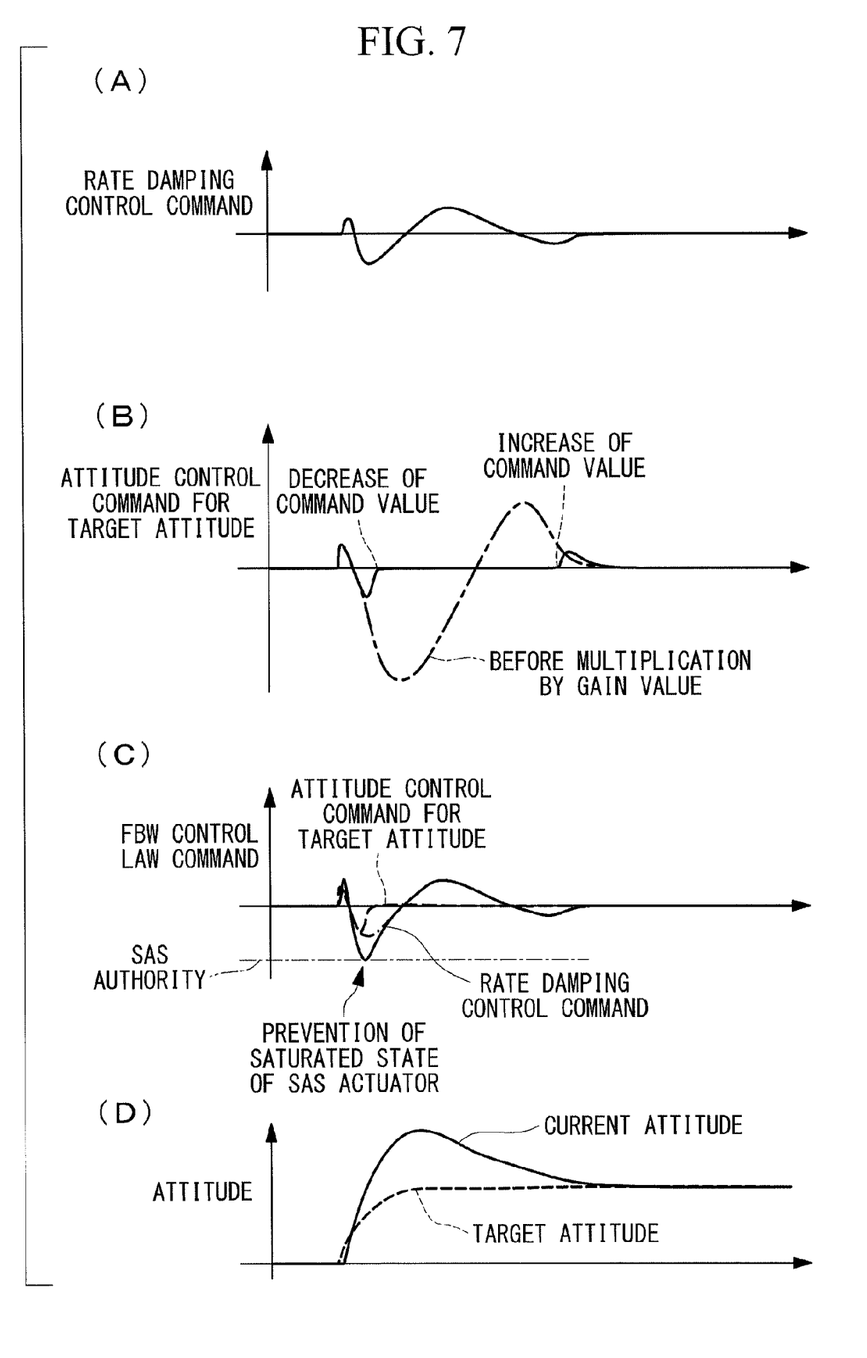
FIG. 7 is a graph showing change in each command and the attitude of an airframe according to the second embodiment of the present invention.

The control method for the aircraft 10 according to the present second embodiment will be described more specifically with reference to FIG. 7. FIG. 7 is a graph showing change in each command and the attitude of the airframe according to the second embodiment.

FIG. 7(A) shows temporal change in the rate damping control command.

FIG. 7(B) shows temporal change in the attitude control command for target attitude. In FIG. 7(B), a one-dot chain line indicates the attitude control command for target attitude before the attitude control command for target attitude is multiplied by a gain value. On the other hand, a solid line indicates the attitude control command for target attitude after the attitude control command for target attitude is multiplied by the gain value. Thus, when the attitude deviation amount exceeds a predetermined value, the value of the attitude control command for target attitude is decreased down to 0 (zero) according to the size of the attitude deviation amount. When the attitude deviation amount becomes small, the value of the attitude control command for target attitude increases again.

FIG. 7(C) shows temporal change in the FBW control law command by a solid line. Since the attitude control command for target attitude has been multiplied by a gain value corresponding to the attitude deviation amount, the FBW control law command is prevented from being beyond the operating range (SAS authority) of the SAS actuator 20, and thereby the SAS actuator 20 is prevented from being in the saturated state. Since the rate damping control command is more effective than the attitude control command for target attitude while the attitude deviation amount is large, the control surface 14 is controlled by the rate damping control command, and the stability of the airframe is improved.

By being multiplied by a gain value corresponding to the attitude deviation amount, the value of the attitude control command for target attitude is decreased below a required value. Therefore, in the aircraft 10 according to the present second embodiment, a reaction force center correction value is inputted to the adjustment mechanism 21 as described above. The adjustment mechanism 21 changes a reaction force center to be given to the control stick 12 on the basis of the reaction force center correction value.

Thereby, when the rate damping control command attenuates, an operation of the control stick 12 the reaction force center of which has been changed is performed so that undershoot is prevented and the attitude is controlled to be a target attitude, as shown in FIG. 7(D).

As described above, since the aircraft 10 according to the present second embodiment generates a gain value with the attitude deviation amount as a required control amount, it is possible to easily generate an appropriate gain value.

If the attitude deviation amount exceeds a predetermined value, the gain value generating section 44 according to the present second embodiment causes the gain value to decrease by a value less than 1 according to the size of the attitude deviation amount. Therefore, the aircraft 10 according to the present second embodiment can cause the attitude control command for target attitude to decrease and cause the rate damping control command for stabilizing the airframe to be effective only when the attitude deviation amount is large.

The present invention has been described with the use of each of the above embodiments. However, the technical scope of the present invention is not limited to the range described in each of the above embodiments. It is possible to make various changes or improvements in each of the above embodiments within the range not departing from the scope of the present invention, and embodiments in which the changes or improvements have been made are also included in the technical scope of the present invention.

For example, though description has been made in each of the above embodiments on the form of using the control stick operation amount or the attitude deviation amount as the required control amount, the present invention is not limited thereto, and other values may be used as the required control amount.

Furthermore, though description has been made in each of the above embodiments on the form of using a command to be added to the attitude control command for target attitude for the purpose of stabilizing the airframe, as the rate damping control command, the present invention is not limited thereto, and other commands may be used as the command for stabilizing the airframe. The other commands include, for example, a command calculated according to a wind force against the aircraft 10 without using a rate signal.

Furthermore, though description has been made in each of the above embodiments on the form of obtaining the FBW control law command by adding the rate damping control command and the attitude control command for target attitude, the present invention is not limited thereto. The form of obtaining the FBW control law command by adding the rate damping control command, the attitude control command for target attitude and, additionally, another control command.

REFERENCE SIGNS LIST 10 aircraft
12 control stick
14 control surface
16 steering mechanism
18 mechanical linkage
20 SAS actuator
21 adjustment mechanism
22 operation amount sensor
24 FBW control law calculating section
26 subtraction section
28 operation amount offset line
40 rate damping control command calculating section
42 attitude control command calculating section
44 gain value generating section
48 addition section
52 multiplication section
54 subtraction section

The invention claimed is:
1. An aircraft comprising:
a control stick for a pilot to manipulate an airframe;
an adjustment part for adjusting an angle of a neutral position of the control stick;
a steering amount transmitting part for mechanically transmitting an operation amount for the control stick to a steering part;
a detection part for detecting the operation amount;
a control amount calculating part for calculating a control amount for the airframe corresponding to the operation amount detected by the detection part;

a subtraction part for subtracting the operation amount outputted from the detection part, from the control amount calculated by the control amount calculating part; and an actuator for adding an operation amount corresponding to a subtraction value outputted from the subtraction part to the operation amount transmitted by the steering amount transmitting part, wherein the control amount calculating part comprises:
- an attitude control calculating part for calculating an attitude control amount for causing an attitude of the airframe to be a target value, on the basis of the operation amount detected by the detection part;
- a gain value generating part for generating a gain value equal to or less than 1 that decreases as a required control amount indicating a control amount to be required from the airframe increases;
- a multiplication part for multiplying the attitude control amount outputted from the attitude control calculating part by the gain value generated by the gain value generating part;
- an addition part for adding a stabilization control amount for stabilizing the airframe to the attitude control amount multiplied by the gain value by the multiplication part and outputting a result to the subtraction part; and
- a correction signal generating part for generating a correction signal for correcting the angle of the neutral position of the control stick according to the attitude control amount which has been decreased by being multiplied by the gain value and outputting the correction signal to the adjustment part.

2. The aircraft according to claim 1, wherein the gain value generating part uses the operation amount detected by the detection part as the required control amount.

3. The aircraft according to claim 1, wherein the gain value generating part uses a deviation between a current attitude of the airframe and a target attitude of the airframe as the required control amount.

4. The aircraft according to claim 1, wherein the gain value generating part generates 1 as the gain value if the required control amount is equal to or below a predetermined value, and generates the gain value that decreases by a value less than 1 according to a size of the required control amount if the required control amount exceeds the predetermined value.

5. A control method for an aircraft comprising: a control stick for a pilot to manipulate an airframe; an adjustment part for adjusting an angle of a neutral position of the control stick; a steering amount transmitting part for mechanically transmitting an operation amount for the control stick to a steering part; a detection part for detecting the operation amount; a control amount calculating part for calculating a control amount for the airframe corresponding to the operation amount detected by the detection part; a subtraction part for subtracting the operation amount outputted from the detection part, from the control amount calculated by the control amount calculating part; and an actuator for adding an operation amount corresponding to a subtraction value outputted from the subtraction part to the operation amount transmitted by the steering amount transmitting part, the control method comprising:
- a first step of calculating an attitude control amount for causing an attitude of the airframe to be a target value, on the basis of the operation amount detected by the detection part;
- a second step of generating a gain value equal to or less than 1 that decreases as a required control amount indicating a control amount to be required from the airframe increases;
- a third step of multiplying the attitude control amount outputted from the attitude control calculating part by the generated gain value;
- a fourth step of adding a stabilization control amount for stabilizing the airframe to the attitude control amount multiplied by the gain value and outputting a result to the subtraction part; and
- a fifth step of generating a correction signal for correcting the angle of the neutral position of the control stick according to the attitude control amount which has been decreased by being multiplied by the gain value and outputting the correction signal to the adjustment part.

6. The aircraft according to claim 2, wherein the gain value generating part generates 1 as the gain value if the required control amount is equal to or below a predetermined value, and generates the gain value that decreases by a value less than 1 according to a size of the required control amount if the required control amount exceeds the predetermined value.

7. The aircraft according to claim 3, wherein the gain value generating part generates 1 as the gain value if the required control amount is equal to or below a predetermined value, and generates the gain value that decreases by a value less than 1 according to a size of the required control amount if the required control amount exceeds the predetermined value.

* * * * *